Dec. 11, 1962 — P. GOLDMAN — 3,067,950
PORTABLE LAWN SHOWER OR THE LIKE
Filed April 6, 1961
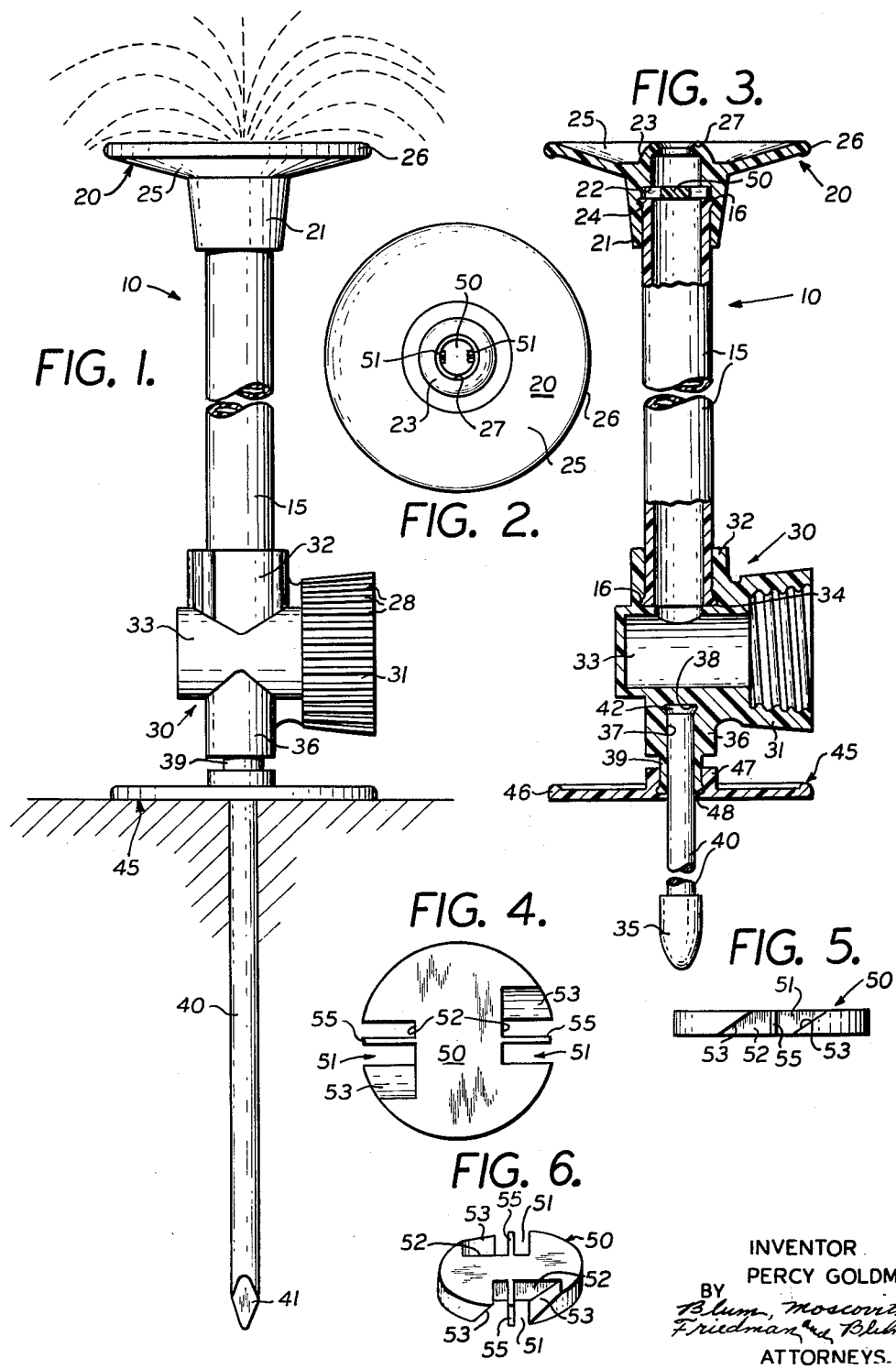
INVENTOR
PERCY GOLDMAN
ATTORNEYS

United States Patent Office

3,067,950
Patented Dec. 11, 1962

3,067,950
PORTABLE LAWN SHOWER OR THE LIKE
Percy Goldman, 411 E. 57th St., New York, N.Y.
Filed Apr. 6, 1961, Ser. No. 101,097
4 Claims. (Cl. 239—276)

This invention relates to portable lawn showers, or the like, and, more particularly, to a portable lawn shower having novel features providing better water distribution, more stable mounting of the shower, and better assembly of the parts.

Lawn showers of the portable type generally comprise an upright pipe or conduit and are arranged to be inserted into the ground, the pipe sometimes being provided with a pointed lower end for this purpose. Near its lower end, the pipe is usually provided with a T or elbow connection or fitting whereby an ordinary garden hose may be connected thereto. Suitable diffusion and spraying means are provided in a head at the upper end of the conduit for providing a usually circular distribution of falling water. The parts may be made of metal, but frequently are made of a suitable plastic.

As hitherto constructed, such lawn showers included a distribution head at the upper end thereof provided with a chamber containing a diffuser disk. This disk has plural angularly spaced slots or notches in its periphery opening outwardly through the periphery. The parallel side walls of these slots are formed at an angle to the axis of the disk so that water, under pressure, flowing upwardly through the pipe or conduit passes through the slots or notches in the disk and is given a whirling motion which, in combination with the remainder of the head structure, provides a whirling spray of water to be discharged from the lawn shower. However, the type of spray discharged from such a shower has left something to be desired from the standpoint of a shower effect.

Another disadvantage of known constructions of prior art lawn showers has been their tendency to tilt or tip as the ground therearound loses its holding power as it becomes soggy or muddy due to the spray discharged therefrom. Still a further disadvantage resides in the type of construction and assembly of the parts of the lawn shower, such construction and assembly increasing the material and labor costs of constructing the shower.

In accordance with the present invention, a portable lawn shower is provided which has a novel water diffuser in its spray head, has novel means for preventing such tilting of the shower when the ground becomes soft or soggy, and has novel constructional features facilitating its assembly and greatly decreasing the cost thereof.

More particularly, the lawn shower of the present invention comprises an upright relatively elongated tube or conduit of plastic composition material which is secured into a T, also preferably formed of plastic composition material, and including a female connection for receiving the usual connection on the end of a garden hose. A spray head, preferably of plastic composition material, is secured in a novel manner to the upper end of the upright conduit and contains a cylindrical chamber receiving a novel water diffuser. This diffuser is in the form of a disk, somewhat similar to those known from the prior art, but including novel constructional features providing a finer and better spray of water from the shower and permitting use of higher water pressure.

To prevent the shower from tilting when the ground becomes soggy or muddy, a relatively wide disk, also preferably of plastic composition material, is secured to the assembly just below the hose connection and forms a wide bearing surface for engagement with the ground to prevent tilting of the shower. The shower is easily mounted in the ground by means of a metal spike which has its end engaged in the T connection.

Novel means are provided for interconnecting the several parts, including beads on the ends of certain tubular parts which telescope into other tubular parts, and a bead on the upper end of the spike. These respective beads snap into internal peripheral grooves in the respective tubular parts receiving the beaded parts, providing for ready and easy interconnection and assembly of the several components of the shower.

For an understanding of the principles of the invention, reference is made to the following description of a typical embodiment thereof as illustrated in the accompanying drawings. In the drawings:

FIG. 1 is an elevational view of a lawn shower embodying the invention as mounted on a lawn or the like;

FIG. 2 is a top plan view of the shower;

FIG. 3 is a generally axial sectional view corresponding substantially to FIG. 1;

FIG. 4 is a plan view of the diffuser;

FIG. 5 is an elevational view of the diffuser; and

FIG. 6 is a perspective view of the diffuser.

Referring to FIGS. 1, 2 and 3, the lawn shower 10 includes a relatively elongated tube 15 of relatively stiff plastic composition material. Tube 15 may have any desired length but, preferably, has a length of about four feet. On the upper end of tube 15 is the head 20 which is formed of a relatively flexible plastic composition material. The lower end of tube 15 is secured in a T 30, likewise of relatively flexible plastic composition material, and a pointed metal spike 40 extends downwardly from T 30. A relatively wide flat disk 45 is slid over the spike 40 and embraces an extension T 30. When the shower is not in use, the pointed end of spike 40 may be protected by a plastic cap or the like indicated at 35, and this plastic cap may likewise be formed of relatively flexible plastic composition material. A novel feature of the invention, described more fully hereinafter, is the diffuser 50 which is mounted in the head 20 for providing the whirling spray effect.

The tube, pipe, or conduit 15, which is made of relatively stiff polystyrene, has lips or beads 16 formed on each end thereof by pressing the ends momentarily against a hot plate or the like. These beads 16 may project a distance of from .005 inch to .010 inch. The purpose of the beads will be described.

The head 20, which is made of polyethylene, is an integral member including an annular disk portion 25 which is inwardly dished, as best seen in FIG. 3. The rim of disk 25 may be enlarged, to reinforce the same, as indicated at 26. An integral tubular or sleeve portion extends inwardly or downwardly from the central area of disk 25, this tubular extension being generally indicated at 21 and decreasing in outer diameter from the disk 25 inwardly. A short distance inwardly from disk 25, the tubular extension 21 has its internal diameter decreased to form a shoulder 22 at the junction of an outwardly extending tubular portion 23 with the tubular portion 21. For a purpose to be described, the inner surface of tubular extension 21 is formed with a peripheral groove 24 immediately inwardly or downwardly from the shoulder 22. The outer end of tubular extension 23 is tapered inwardly, as at 27, to form the discharge outlet for the water spray. It should be noted that the tubular extension 23 does not project outwardly beyond the limiting diametric plane of the outer rim of the disk 25.

The T 30, which is formed of polyethylene, includes a stem 31 which is threaded to receive a male coupling on the end of a garden hose or the like, whereby water may be supplied to the portable shower 10. Integral with the stem 31, the T 30 has an upper tubular branch 32 whose inner diameter is substantially equal to the outer diameter of the conduit or tube 15. The outer surface of stem 31 may be knurled as indicated at 28, to facilitate attachment of a supply hose to the shower 10. Branch 32 communicates with the cylindrical extension 33 of the stem 31 and, just outwardly of the outer surface of extension 33, the inner surface of branch 32 is formed with a peripheral groove 34 for a purpose to be described. The downwardly extending branch 36 of the T is "blind" or closed, and is formed with an axial recess 37 receiving the spike 40. At its innermost and closed end, the inner surface of passage 37 is formed with a groove 38 extending peripherally thereof for a purpose to be described. A reduced tubular extension 39 extends from the branch 36 and forms a continuation of the passage 37.

The spike 40 has generally the appearance of an ordinary headed spike, having a point 41 but no head in the usual sense. Instead of this, the "head" of spike 40 is flattened slightly to form a bead 42 which may have a radial height of from .005 inch to .010 inch. When the shower is not in use, the pointed end 41 of the spike 40 may be protected by a conforming cap 35 which is preferably formed of suitable relatively flexible plastic composition material such as polyethylene.

The support disk 45 is made of flexible plastic composition material, such as polyethylene. This support disk has a reinforcing rim 46 around its outer periphery and a tubular extension 47 which has an inner diameter having a close fit over the tubular extension 39 of branch 36.

Referring to FIGS. 3, 4, 5 and 6, the diffuser 50 is a disk of preferably flexible plastic composition material, such as polyethylene, and has an outer diameter of the order of the inner diameter of extension 21 of head 20. In a manner common to known diffusers of this type, diffuser 50 has at least a pair of angularly spaced and preferably diametrically opposed substantially rectangular recesses or notches 51 extending inwardly from its periphery, these notches having chordially extending inner edges 52 and parallel surfaced side edges 53 whose surfaces extend at an acute angle with respect to the axis of the diffuser. If, in the plan view of FIG. 4, the exposed circular surface of the disk is considered to be the top surface thereof, then the "tilt" of each notch at an angle to the axis is in the same direction and upwardly and outwardly. This would correspond to the illustration of the notch 51 as shown in FIG. 5. The construction of the diffuser 50, as thus far described, is conventional and known to the art.

In accordance with the present invention, the efficiency of such a diffuser disk is greatly increased to provide a more powerful spray and better water distribution by forming a thin generally radial flap 55 to extend centrally from the inner wall 52 of each notch 51. These flaps are so thin and flexible that they "wobble" or vibrate under water pressure, and thus impart the better water distribution characteristics as well as providing for the use of higher pressure to provide a more powerful spray due to the water being given a greater than usual tangential component of velocity by flowing through the notches 51 under pressure. The flaps 55 may lie in axial planes of the diffuser 50 or may be tilted to extend at an angle to the axis of the diffuser 50. If they are tilted, it is preferred that they are tilted in the opposite direction from the angle of tilt of the notches 51.

It will be recalled that the material of the tubular conduit 15 is a relatively stiff plastic composition material, such as polystyrene, whereas that of the other elements of the device, except the spike 40, is of a relatively flexible plastic composition material such as polyethylene. There is no known mutual solvent for these two materials, so that it is not feasible to join the other elements to the conduit 50 by the use of a solvent. However, by the aforementioned provision of beads 16 on the conduit 15, the latter may have a frictional snap fit in the grooves of the head 20 and the T 30, and by providing the rim 42 on the spike 40, the latter may have a snap frictional fit in the groove of T 30.

Thus, in assembling the shower, a diffuser 50 is placed against the shoulder 22 of the extension 21 of head 20 and then the conduit 15 is forced into the extension 21 until its bead 16 snaps into the groove 24. The other end of the conduit 15 is similarly forced into the branch 32 of the T 30 until its bead 16 snaps into the groove 34. The spike 40 is assembled to the shower by forcing it into the branch 36 until its enlarged head 42 snaps into the groove 38. The support disk 45 is then slipped over the spike 40 and pushed up so that its tubular boss 47 has a tight frictional fit over the reduced extension 39 of the branch 36. If desired, the outer end of this reduced extension may be beaded to snap into a groove or the like in the disk 45, this groove being indicated at 48.

When the shower is set up in a lawn or the like, as by driving or piercing of the spike 40 into the ground 11, as shown in FIG. 1, the support disk 45 overlies a fairly large area of the ground so as to hold the shower upright even though the ground may lose its holding power due to becoming wet, soggy, or muddy during use of the shower. The male coupling of a garden hose is screwed into the stem 31 of the T 30, with the use of the usual washer if desired, and the shower is ready for use. When the water is turned on, it enters the T 30 and flows upwardly, under pressure, through the conduit 15 and is given a very pronounced whirling and a diffusing action by the diffuser 50, with the slots 51 providing the desired tangential component of velocity to the water so as to form a circular spray. The water is uniformly distributed over the area of spray, this distribution being facilitated by the very flexible flaps 55 disposed within the slots 51. Also, due to the "breaking up" action of these flaps 55 on the water, much higher water pressure may be used with the shower of the invention than with known showers of this general type. Thus, the spray can reach a height of fifteen feet above the ground and the water be distributed over an area having a radius of twenty-five feet.

The shower is useful not only for spraying lawns but also as a shower for persons.

While a specific embodiment of the invention has been shown and described in detail to illustrate the application of the principles of the invention, it will be understood that the invention may be embodied otherwise without departing from such principles.

What is claimed is:

1. A portable lawn shower, or the like, comprising, in combination, a relatively elongated tubular conduit; a fitting secured to one end of said conduit and adapted for connection to a garden hose; a spray head secured to the opposite end of said conduit and having a discharge opening substantially aligned with said conduit; and a diffuser disk positioned in the path of water flow from said conduit to said discharge opening and arranged to impart a whirling motion to the discharge of water; said diffuser disk being circular and having at least a pair of angularly spaced substantially rectangular notches opening outwardly through its periphery; the side walls of said notches being parallel and extending at an angle to the axis of said disk; each notch having an integral, very thin flap, extending substantially radially from the central area of its inner wall to the disk periphery; said flaps being disposed in the path of water deflected tangentially through said notches to further diffuse the water.

2. A portable lawn shower, or the like, as claimed in claim 1 in which there are a pair of diametrically opposite notches in said diffuser disk.

3. For use in a spray device arranged to provide a whirling spray of water, a diffuser disk having at least a pair of angularly spaced rectangular notches opening through its periphery; the side walls of said notches being parallel and extending at an angle to the axis of said disk; each notch having an integral, very thin and flexible flap extending substantially radially and centrally from its inner wall to its periphery and in the path of water flow through said notches.

4. A diffuser disk as claimed in claim 3 in which said diffuser disk is made of plastic composition material.

References Cited in the file of this patent

UNITED STATES PATENTS

| | | |
|---|---|---|
| 515,625 | Stott | Feb. 27, 1894 |
| 1,152,636 | Houston | Sept. 7, 1915 |
| 1,549,194 | Gensmer | Aug. 11, 1925 |
| 1,756,483 | Estep | Apr. 29, 1930 |
| 2,845,304 | Stelma | July 29, 1958 |
| 2,852,307 | Clark | Sept. 16, 1958 |
| 2,979,272 | Thorrez | Apr. 11, 1961 |